United States Patent
Perez

(10) Patent No.: US 8,516,141 B2
(45) Date of Patent: Aug. 20, 2013

(54) METHOD AND SYSTEM FOR MODIFYING AND/OR CHANGING A MAC ID UTILIZING AN IPV6 NETWORK CONNECTION

(75) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 226 days.

(21) Appl. No.: 12/552,048

(22) Filed: Sep. 1, 2009

(65) Prior Publication Data

US 2011/0055362 A1   Mar. 3, 2011

(51) Int. Cl.
G06F 15/16 (2006.01)

(52) U.S. Cl.
USPC .................. 709/230; 709/203; 709/227

(58) Field of Classification Search
USPC .................................. 709/203, 220–230
See application file for complete search history.

(56) References Cited

U.S. PATENT DOCUMENTS

| 7,254,835 | B2* | 8/2007 | St. Pierre et al. | 726/14 |
|---|---|---|---|---|
| 7,263,075 | B2* | 8/2007 | Roh et al. | 370/310 |
| 7,305,481 | B2* | 12/2007 | Blanchet et al. | 709/230 |
| 7,385,981 | B2* | 6/2008 | Choi et al. | 370/392 |
| 7,467,214 | B2* | 12/2008 | Chin | 709/230 |
| 7,974,269 | B2* | 7/2011 | Takeda et al. | 370/352 |
| 2003/0026230 | A1* | 2/2003 | Ibanez et al. | 370/338 |
| 2004/0093434 | A1* | 5/2004 | Hovell et al. | 709/249 |
| 2006/0190717 | A1* | 8/2006 | Ohhira | 713/153 |
| 2008/0189436 | A1* | 8/2008 | Vaswani et al. | 709/242 |
| 2009/0248846 | A1* | 10/2009 | Cohn | 709/223 |
| 2010/0063988 | A1* | 3/2010 | Khalid et al. | 709/202 |
| 2010/0146088 | A1* | 6/2010 | Jin | 709/222 |

* cited by examiner

Primary Examiner — Phuoc Nguyen
(74) Attorney, Agent, or Firm — Buchanan Ingersoll & Rooney PC

(57) ABSTRACT

A system that facilitates enhancing security for a computer device utilizing an IPv6 network connection. The system includes a computer device having a software module, which performs the following steps: capturing outgoing IPv6 packets, the outgoing IPv6 packets having a stateless autoconfiguration IPv6 address, which is configured at least partially based on a computer device identifier; modifying the IPv6 address associated with the computer device identifier to generate a modified IPv6 address; and returning the outgoing IPv6 packet with the modified IPv6 address to a network layer of the Internet Protocol of the computer device. In accordance with an example, the computer device is an image forming apparatus.

22 Claims, 2 Drawing Sheets

METHOD AND SYSTEM FOR MODIFYING AND/OR CHANGING A MAC ID UTILIZING AN IPV6 NETWORK CONNECTION

FIELD OF THE INVENTION

The present invention relates to a method and system for modifying and/or changing the MAC ID (Media Access Control Identifier) or interface identifier for a computer device or apparatus, and more specifically, a method and system for modifying and/or changing the MAC ID of an image forming apparatus using a software module, which is separate from the operating system of the image forming apparatus.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (e.g., image forming apparatuses and other devices) can configure themselves automatically (i.e., stateless address autoconfiguration) when connected to an IPv6 network using ICMPv6 neighbor discovery messages. When first connected to a network, an IPv6 host sends a link-local multicast neighbor solicitation request advertising its tentative link-local address for double address detection (dad) if no problem is encountered the host uses the link-local address; The router solicitations are sent (or router advertisements are received depending on timing) to obtain network-layer configuration parameters, routers respond to such a request with a router advertisement packet that contains network-layer configuration parameters.

It can be appreciated that most network interfaces come with an embedded IEEE Identifier (i.e., a link-layer MAC address), and in those cases, stateless address autoconfiguration uses the IEEE identifier to generate a 64-bit interface identifier. By design, the interface identifier is likely to be globally unique when generated in this fashion. The interface identifier is in turn appended to a prefix to form the 128-bit IPv6 address. The first-half 64 bits are allocated to a network prefix included in router advertisement (RA) from the router. The second-half 64 bits are allocated to a EUI-64 format interface ID as a 64-bit identifier decided by the IEEE. In the EUI-64 format interface ID, the Media Access Control address (MAC address) is encapsulated. In 64 bits of the entire interface ID, the first 24 bits are allocated to a number indicating a manufacturer administrated by the IEEE, the next 16 bits are allocated to "FFFE", and the last 24 bits are allocated to an expanded identification number managed by the manufacturer.

It can be appreciated that any IPv6 capable device with stateless addressing including image forming apparatuses (e.g., Multi-Function Peripherals (MFP) and printers) typically will include a unique identifier or Media Access Control address (MAC address). The MAC address is assigned to network adapters or network interface cards (NICs) by the manufacturer for identification, and used in the Media Access Control protocol sublayer of the Internet Protocol Version 6 (IPv6). If assigned by the manufacturer, a MAC address usually encodes the manufacturer's registered identification number. It can be appreciated that the MAC address can also be known as an Ethernet Hardware Address (EHA), hardware address, adapter address, or physical address.

When using the protocol stateless addressing for IPv6, which is required by the IPv6 Ready Logo Program, both link-local addresses and global addresses are determined by concatenating an identifier unique to the network adapter (or network interface card) of the device (e.g., image forming apparatus). However, since the MAC ID does not change as long as the physical hardware adapter is not changed, the use of the MAC ID for generating IPv6 addresses could subject the apparatus or device to additional security risks.

OBJECTS AND SUMMARY

In consideration of the above issues, it would be desirable to have an software module or software application associated with a computer device or host device such as an image forming apparatus, which changes, preferably in a time stamp, key word and/or random methodology, the image forming apparatus identifier (or MAC ID) for security purposes during use in the IPv6 protocol.

In accordance with an exemplary embodiment, a system that facilitates enhancing security for a computer device utilizing an IPv6 network connection, comprises: a computer device, the computer device having a software module, which performs the following steps: capturing outgoing IPv6 packets, the outgoing IPv6 packets having a stateless autoconfiguration IPv6 address, which is configured at least partially based on a computer device identifier; modifying the IPv6 address associated with the computer device identifier to generate a modified IPv6 address; and returning the outgoing IPv6 packet with the modified IPv6 address to a network layer of the Internet Protocol of the computer device.

In accordance with another exemplary embodiment, a method for enhancing security for a computer device utilizing an IPv6 network connection, comprises: capturing outgoing IPv6 packets, the outgoing IPv6 packets having a stateless autoconfiguration IPv6 address, which is configured at least partially based on a computer device identifier; modifying the IPv6 address associated with the computer device identifier to generate a modified IPv6 address; and returning the outgoing IPv6 packet with the modified IPv6 address to a network layer of the Internet Protocol of the computer device.

In accordance with a further exemplary embodiment, a computer readable medium containing a computer program for enhancing security for a computer device utilizing an IPv6 network connection, wherein the computer program comprises executable instructions for: capturing outgoing IPv6 packets, the outgoing IPv6 packets having a stateless autoconfiguration IPv6 address, which is configured at least partially based on a computer device identifier; modifying the IPv6 address associated with the computer device identifier to generate a modified IPv6 address; and returning the outgoing IPv6 packet with the modified IPv6 address to a network layer of the Internet Protocol of the computer device.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
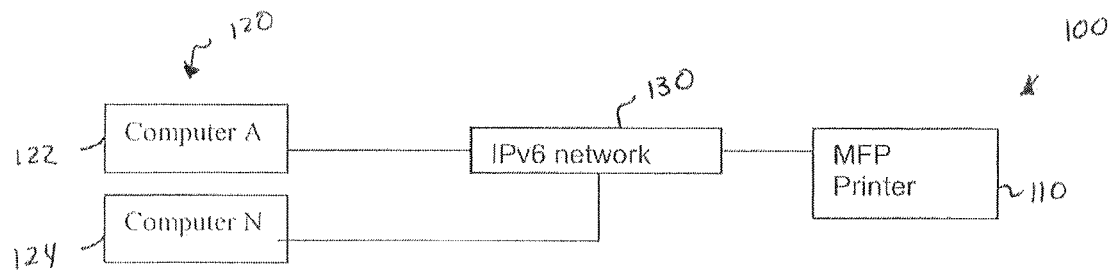
FIG. 1 is an illustration of a network printing system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a network printing system 100, which includes an image forming apparatus 110 in accordance with an exemplary embodiment. As shown in FIG. 1, the network printing system 100 is composed of an image forming apparatus 110 and at least one client device 120. The image forming apparatus 110 and the at least one client device 120 is connected to each other through a communication network 130 in a state capable of performing data communications. Examples of communication networks 130 consistent with embodiments of the invention include, but are not limited to, the Internet, an Intranet, a local area network (LAN) and a wide area network (WAN). The image forming apparatus 110 and the client device 120 can be connected with a wire or can be connected with a wireless connection by using radio frequency (RF), infrared (IR) transmission, USB, IEEE1394 and/or other suitable wireless technology.

In accordance with an exemplary embodiment, the image forming apparatus 110 may be embodied by a printer, a Multi-Function Peripheral (MFP) and other known image forming apparatuses, which prints an image on a printing medium (or a recording medium) such as a sheet of paper based on printing data generated by the at least one client device 120. In accordance with an exemplary embodiment, the image forming apparatus 110 is a Multi-Function Peripheral (MFP), which includes at least a copy function, an image reading function, and a printer function, and forms an image on a sheet based on a print job (print instruction) sent from the at least one client device 120, image data read by an image reading section, such as a scanner, provided in the image forming apparatus 110, or the like.

In accordance with an embodiment, the at least one client device 120, which may be embodied by a computer system, and generates the printing data usable in the image forming apparatus 110 and transmits the generated printing data to the image forming apparatus 110. An example of the at least one client device 120 may include a computer and/or a portable device such as a notebook personal computer, a cellular phone and a personal digital assistant (PDA). The image forming apparatus 110 and the at least one client device 120 can constitute an image forming system to install a communication port, to generate printing data, and to perform a printing operation of forming an image on a printing medium according to the printing data.

It can be appreciated that the client device 120 and the image forming apparatus 110 may be interconnected by at least one of two paths. That is, the client device 120 and the image forming apparatus 110 may be interconnected by a local connection system and/or via a communication network 130. If the client device 120 and the image forming apparatus 110 are interconnected by the local connection system, the client device 120 receives network information of the image forming apparatus 110 from the image forming apparatus 110. The network information of the image forming apparatus 110 includes a printer name, an Internet Protocol (IP) address, and a Media Access Control (MAC) address of the image forming apparatus 110.

It can be appreciated that the at least one client device 120 can be a plurality of personal computers (Computer A 122, Computer N 124), and has the function of sending a print job to the image forming apparatus 110. A printer driver program (hereinafter, sometimes simply referred to as a printer driver) is installed in the client device 120, and the client device 120 uses the function of the printer driver to generate a print job including the data of print conditions to be applied at the time of image formation, image data, and the like, and to send the generated print job to the image forming apparatus 110.

In accordance with an exemplary embodiment, the client device 120 is a personal computer composed of a central processing unit (CPU) or processor, an operation section, a display section, a communication section, Random Access Memory (RAM), and a hard disk drive (or HDD). The central processing unit or processor reads various processing programs stored in the HDD and expands the read processing programs in a work area formed in the RAM to perform various kinds of control processing in cooperation with the programs according to operation signals input from the operation section or instruction signals received by the communication section. The communication section can include a LAN adapter, a router, a terminal adapter (TA), and the like, and performs sending and receiving of data with external equipment such as the image forming apparatus 110 connected through the communication network 130.

In accordance with an exemplary embodiment, the image forming apparatus 110 is a Multi-Function Peripheral (or MFP) composed of a central processing unit (CPU) or processor, an operation section, a display section, an image reading section, an image forming section, a communication section, Random Access Memory (RAM), Read Only Memory (ROM), and a hard disk drive (HDD). It can be appreciated that the central processing unit or CPU reads the various processing programs stored in the ROM and expands the read processing programs to a work area formed in the RAM to perform various kinds of control processing in cooperation with the expanded programs according to operation signals input from the operation section or instruction signals received by the communication section. For example, the CPU performs a sequence of processing concerning forming the image.

The image reading section is the so-called scanner, which reads a document image to generate image data, and includes a platen glass on which a document is placed, and a scanning optical system, which scans the document image on the platen glass to form the image thereof on a CCD image sensor. The image reading section performs the analog to digital (A/D) conversion of an image signal generated based on the document image read by the CCD image sensor to generate a digital image signal.

The image forming section is a functional section including constituent elements necessary for forming an image by using an image forming process, such as an electrophotographic printing process, an electrostatic recording process, a thermal transfer process, etc. For example, the image forming section is composed of a photosensitive body, a transfer belt, a fixing device, various conveying belts, an electronic circuit, a sheet feeding section, a sheet ejection section and the like. The image forming section forms an image on a sheet supplied from the sheet feeding section based on the image data generated by the image reading section, the image data included in a file received by the communication section, or the like, to convey the sheet to the sheet ejection section in accordance with an instruction of the CPU. Moreover, the sheet feeding section includes a sheet feeding tray, and the sheet ejection section includes a sheet ejection tray.

The communication section includes a Local Area Network (LAN) adapter, a router, a Terminal Adapter (TA), or the like, and performs the sending and receiving of data with external equipment, such as the client device 120, connected to the communication section through the communication network 130. For example, the communication section receives print job data from the client device 120.

The RAM forms a work area to temporarily store the various processing programs to be performed by the CPU and the data concerning these programs. Moreover, the RAM stores the file included in the print job data received from the client device 120 by the communication section. The ROM stores various processing programs to be performed by the CPU, various pieces of data, and the like. These various programs are stored in the forms of readable program codes, and the CPU sequentially performs the operations in accordance with the program codes.

The hard disk drive or HDD is a storage apparatus and stores the image data read by the image reading section, the files included in the print job data received from the client device 120 by the communication section, a usage frequency list generated by the CPU, and the like.

The image forming apparatus 110 has a Media Access Control Identifier (or MAC ID), which is a globally unique identifier assigned to the image forming apparatus. The MAC ID is also often referred to as a hardware or physical address. It can be appreciated that MAC IDs (or addresses) are typically 6-byte (48-bits) in length, and written in a MM:MM:MM:SS:SS:SS format. The first 3-bytes are an identification or ID number of the manufacturer, which is assigned by an Internet standards body. The second 3-bytes are a serial number assigned by the manufacturer.

In IPv4, hosts were originally configured manually. Later, host configuration protocols like DHCP enabled servers to allocate IP addresses to hosts that joined the network. However, IPv6 takes this a step further, by defining a method for some devices, such as image forming apparatuses to automatically configure their IP addresses and other parameters without the need for a server. Unfortunately, this also provides some security risks to devices from hackers and the like. Although, IPv6 also defines methods whereby the IP addresses on a network can be renumbered (changed en masse), it can be appreciated that it would be desirable to be able to change or generate an identifier (or MAC ID) for an image forming apparatus 110, which protects the identity of the image forming apparatus. It can be appreciated that the system and methods as described herein are not limited to computer devices or image forming apparatuses, and can be extended to other apparatuses including any device having Media Access Control Identifiers (or MAC IDs) and/or any IPv6 capable device with stateless addressing.

In the IPv6 protocol, the generation of an IP address (or IPv6 address) for an image forming device or other apparatus/device is defined in RFC 2462, which is entitled "IPv6 Stateless Address Autoconfiguration." The IPv6 stateless autoconfiguration utilizes several other new features in IPv6, including link-local addresses, multicasting, the Neighbor Discovery (ND) protocol, and the ability to generate the interface identifier of an address from the underlying data link layer address (or MAC ID). The general idea is to have a computer device or image forming apparatus generate a temporary address until it can determine the characteristics of the network it is on, and then create a permanent address it can use based on that information. In accordance with an exemplary embodiment, the steps a computer device or image forming apparatus takes when using stateless autoconfiguration is generally as follows:

Link-Local Address Generation: The device or apparatus generates a link-local address, which is one of the two types of local-use IPv6 addresses. The link-local addresses has "1111 1110 10" for the first ten bits. The generated address uses those ten bits followed by 54 zeroes and then the 64 bit interface identifier, which will typically be derived from the data link layer (MAC) address.

Link-Local Address Uniqueness Test (or Double address detection (DAD)): The node tests to ensure that the address it generated isn't for some reason already in use on the local network. However, it can be appreciated that this is very unlikely to be an issue if the link-local address came from a MAC address. The device or apparatus sends a Neighbor Solicitation message using the Neighbor Discovery (ND) protocol, and listens for a Neighbor Advertisement in response that indicates that another device is already using its link-local address; if so, either a new address must be generated, or autoconfiguration fails and another method must be employed.

Link-Local Address Assignment: Assuming the uniqueness test passes, the device assigns the link-local address to its IP interface. This address can be used for communication on the local network, however, it cannot be used on the wider Internet (or communication network), since link-local addresses are not routed.

Router Contact: The node next attempts to contact a local router for more information on continuing the configuration. This is done either by listening for Router Advertisement messages sent periodically by routers, or by sending a specific Router Solicitation to ask a router for information on what to do next.

Router Direction: The router provides direction to the node on how to proceed with the autoconfiguration. The router can tell the node that on this network "stateful" autoconfiguration is in use, and tell it the address of a DHCP server to use. Alternately, the router will tell the host how to determine its global Internet address.

Global Address Configuration: Assuming that stateless autoconfiguration is in use on the network, the host will configure itself with its globally-unique Internet address. This globally-unique address is generally formed from a network prefix provided to the host by the router, combined with the device's identifier as generated in the first step.

It can be appreciated that when using the protocol stateless addressing (stateless autoconfiguration) for IPv6, which is required by the IPv6 Ready Logo Program, the link-local addresses and global addresses are determined by concatenating an identifier unique to the adapter. For example, in generating an IPv6 address, an image forming apparatus having an adapter with a MAC ID of: A0:4B:08:D2:CE will have a link-local address of Fe08:2a0:4bff:fe08:d2ce/64. Thus, when a MAC address broadcast is sent out, each network interface card on the local area network will see the broadcast address and automatically pass the information up to the upper layers of the OSI model.

It can be appreciated that typically, the MAC ID or interface identifier will not change as long as the physical hardware adapter is not changed. Accordingly, for a computer device, such as an image forming apparatus, which follows the IPv6 specifications, the apparatus could have trouble, if an intruder acted using the same ID. In addition, an intruder could even shut down the IPv6 functionality by sending a double address detection message corresponding to the desired IPv6 link-local address or global address.

Figure 2:
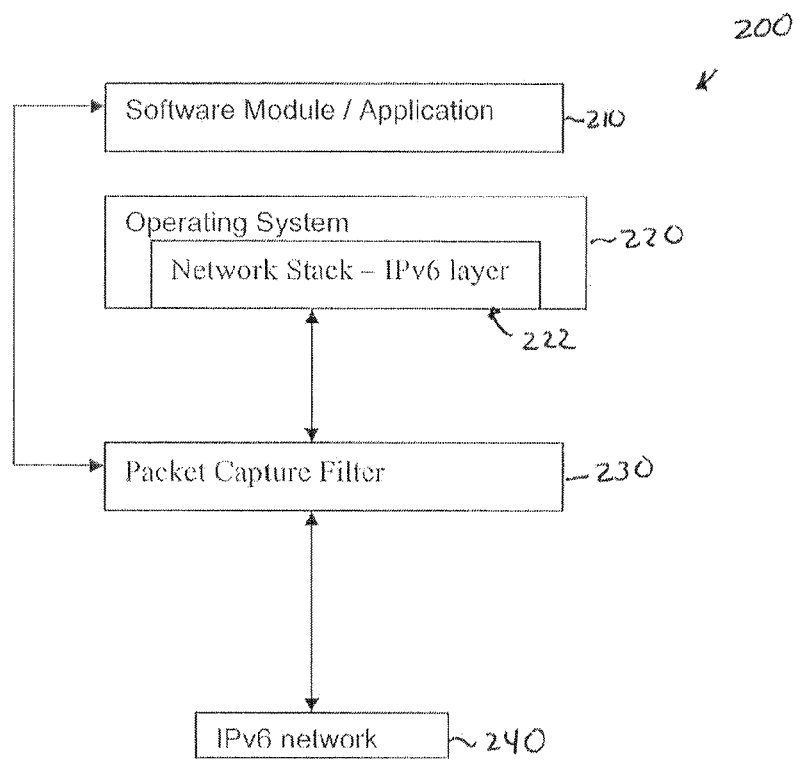
FIG. 2 is a diagram of an implementation of a software module, which generates and/or changes the MAC ID of an image forming apparatus in accordance with an exemplary embodiment.

FIG. 2 is a schematic illustration of a computer device in the form of an image forming apparatus 200 having a software module 210, which can be controlled by a network administrator to generate an IPv6 address for a host apparatus or device. In accordance with an exemplary embodiment, the software module 210 captures the IPv6 packet and modifies the IPv6 address by changing and/or modifying the image forming apparatus identifier (or computer device identifier), which is used to generate the stateless autoconfiguration IPv6 address. It can be appreciated that in accordance with an exemplary embodiment, the software module 210 captures the IPv6 packet before the IPv6 packet is broadcast and/or any of the IPv6 packets are sent from the image forming apparatus 200 to the IPv6 network 240.

As shown in FIG. 2, the software module 210 is preferably an application level module, which captures outgoing and incoming IPv6 packets from the Network Stack or Layer 222 (i.e., IPv6 Layer), which generates the IPv6 packets. It can be appreciated that in a stateless address autoconfiguration, the IPv6 globally-unique address is generally formed from a network prefix provided to the computer device (or image forming apparatus) by the router, combined with the computer device's identifier as generated in forming the link-local address.

In accordance with an exemplary embodiment, the software module 210 captures the IPv6 globally-unique address using a packet capture filter 230. The packet capture filter 230 captures the outgoing and/or incoming IPv6 packets from the Network Stack 222 within the operating system 220 of the image forming apparatus 200. The packet capture filter 230 then forwards the IPv6 packet to the software module 210, where the IPv6 packet is modified, such that the IPv6 packet no longer contains information pertaining to the identity of the image forming apparatus and/or MAC ID of the image forming apparatus. Once the IPv6 address of the IPv6 packet has been modified, the IPv6 packet is broadcast and/or sent out via the communication network (i.e., IPv6 network) 240. It can be appreciated that the software module 210 can capture the IPv6 packet before the initial broadcast (i.e., link-local address uniqueness test and global address DAD) and/or alternatively, before the IPv6 packet is sent over the communication network 240. It can be appreciated that all IPv6 addresses will go through the same process of Double address detection (DAD), even if the link local does not have problems with double address detection.

In accordance with an exemplary embodiment, the software module 210 generates a modified IPv6 address by capturing the outgoing IPv6 packets having an stateless autoconfiguration IPv6 address, which is configured at least partially based on a computer device identifier (or image forming apparatus identifier); modifying the IPv6 address associated with the computer device identifier (or image forming apparatus identifier) to generate a modified IPv6 address; and returning the outgoing IPv6 packet with the modified IPv6 address to a network layer (or Network stack) of the Internet Protocol of the operating system of the computer device (or image forming apparatus 200).

In accordance with an exemplary embodiment, the software module 210 further sends the outgoing IPv6 packet with the modified IPv6 address to at least one client device 120 (FIG. 1) via an IPv6 communication network 240. The software module 210 is also configured to capture incoming IPv6 packets having the modified IPv6 address from the client device before the IPv6 packet is received within the network layer; and transforming the modified IPv6 address into the stateless autoconfiguration IPv6 address.

In accordance with another exemplary embodiment, the software module 210 is configured to save the original computer device identifier or image forming apparatus identifier, which is preferably the MAC ID (Media Access Control Identifier) of the computer device or image forming apparatus 110, and creates a new identifier (or new ID) for the computer device or image forming apparatus based a method chosen by the network administrator. In accordance with an exemplary embodiment, the new identifier can be generated based on a time stamp, keyword, and/or random number generator methodologies. The new identifier is then used to generate a modified IPv6 address for the computer device or image forming apparatus 200. In accordance with an exemplary embodiment, the new identifier (or ID) can be changed and/or modified after a specified amount of time, a specified amount of traffic received, or triggered by a security protocol, such as IPsec and/or SSL. The software module's 210 functionality also can be enabled or disabled at will by a network administrator or other designated individual.

The operating system (OS) of the computer device (or image forming apparatus), which acts as an interface between hardware and user is responsible for the management and coordination of activities and the sharing of the resources within the image forming apparatus. In accordance with an exemplary embodiment, the software module 210 runs on the operating system of the computer device (or image forming apparatus), and the network layer is under or a part of the operating system. It can be appreciated that by utilizing a software module 210 as described herein, the operating system of the image forming apparatus does not need to be altered or changed in anyway. In addition, the network administrator has the ability to control the method of generating the new identifier (or new ID), which in the absence of the software module 210 will be set forth by the operating system. Thus, a network administrator has additional flexibility and ability to set and change the method of generating the new identifier for the computer device (or image forming apparatus) without regards to the IP address protocol as set forth by the operating system of the computer device (or image forming apparatus 200).

Figure 3:
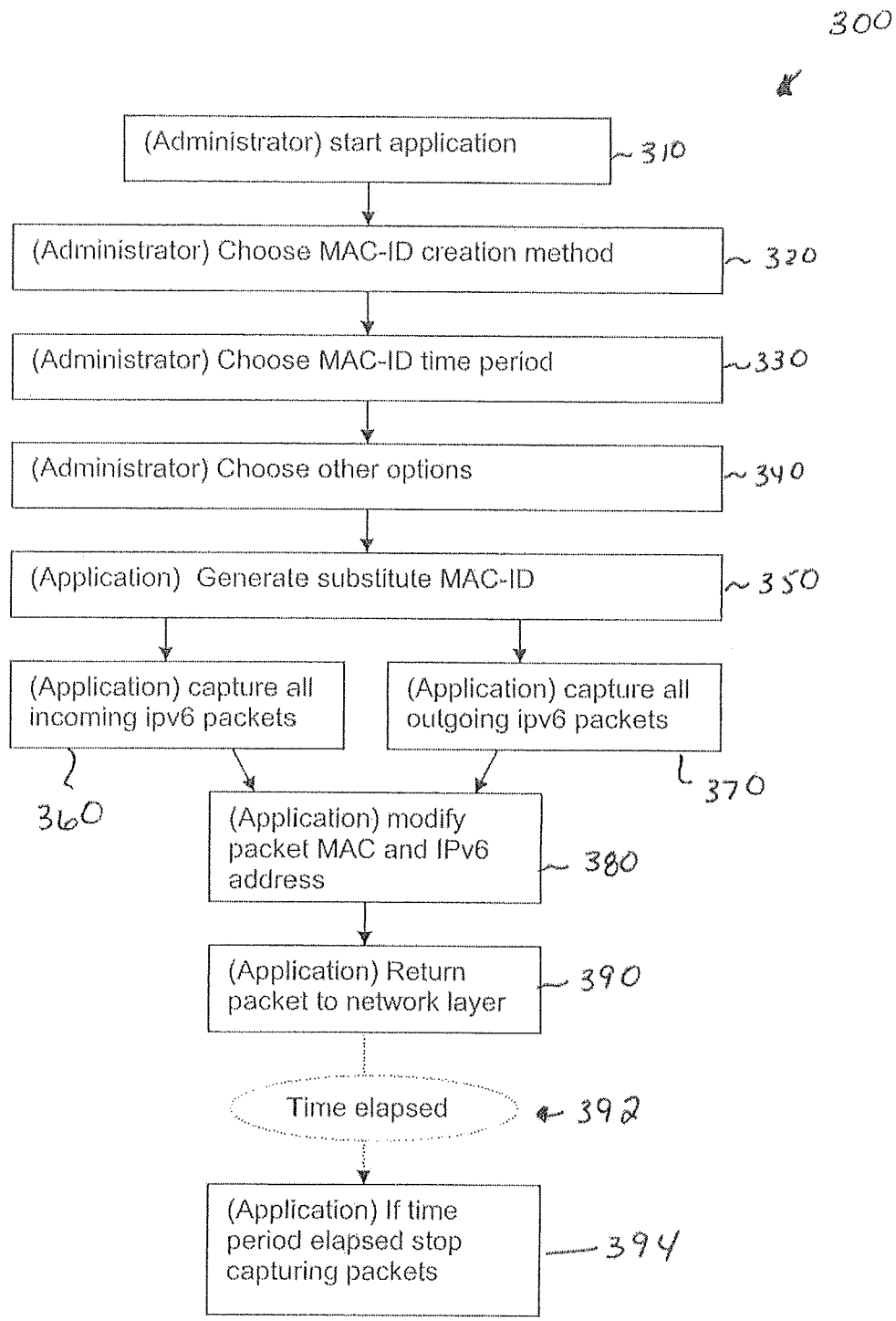
FIG. 3 is a flow chart of an implementation of a software module, which generates and/or changes the MAC ID of an image forming apparatus in accordance with another exemplary embodiment.

FIG. 3 is an illustration showing a flow chart implementing a software module to change an image forming apparatus identifier 300, in the form of a Media Access Control identifier (or MAC ID) in accordance with an exemplary embodiment. As shown in FIG. 3, in step 310, the system includes a software module (or application) having a MAC ID application, which includes the ability to randomly or otherwise change the MAC ID of an image forming apparatus. In accordance with an exemplary embodiment, the software module's functionality is enabled by a network administrator or other designated individual. It can be appreciated that as set forth above, the software module is outside of the image forming apparatus' operating system (OS), such that the network administrator can control the functionability of the software module without accessing the image forming apparatus's operating system.

In step 320, a MAC ID creation method is chosen by the network administrator. It can be appreciated that the MAC ID creation method can be a time step methodology, a key work methodology, a random methodology or any other methodology, which assigns or selects a new MAC ID to the image forming apparatus, and which can be used to generate an IPv6 address. In step 330, the network administrator can set forth a desired time period for use of the new MAC ID and/or other methodology of selecting the new MAC ID. In step 340, other options for setting the MAC ID can be chosen by the administrator, including replacing the newly generated MAC ID after a specified amount of time, replacing the new MAC ID after a specified amount of traffic has been received, or triggered by security protocols, such as IPsec and/or SSL.

In step 350, the software module 210 as shown in FIG. 2 generates a substitute MAC ID (or modified MAC ID) based on the options as set forth in steps 320, 330 and 340. In step 370, once the options for generating the new MAC ID has been chosen and set by the network administrator and the software module has been activated, the software module 210 begins capturing all outgoing IPv6 packets from the network layer, which have been generated pursuant to the IPv6 protocol. It can be appreciated that the outgoing IPv6 packets will include an IPv6 address having a 64-bit address associated with the MAC ID. In step 360, the software module 210 captures all incoming IPv6 packets, which are returning to the image forming apparatus (or host device).

In accordance with an exemplary embodiment, and as shown in step 380, the software module modifies the stateless autoconfiguration IPv6 address, which has been generated pursuant to the IPv6 protocol, and generates a new identifier (or substitute MAC ID) for the image forming apparatus and modifies the IPv6 address, such that the modified IPv6 address no longer includes the MAC ID of the image forming apparatus. In step 390, once the software module has modified the IPv6 address by generating a new identifier or MAC ID, which in turn generates a modified IPv6 address (or new IPv6 address), the software module returns the packet to the network layer. The network layer then sends the modified packet over the IPv6 communication network with the new IPv6 address, which does not include the MAC ID of the image forming apparatus.

In accordance with an exemplary embodiment, in step 394, if a set time period has elapsed 392, the software module can be programmed by the network administrator to stop capturing incoming and outgoing packets and the method and process of generating a new MAC ID for an image forming apparatus can be repeated.

In accordance with another exemplary embodiment, a computer readable medium containing a computer program for enhancing security for an image forming apparatus utilizing an IPv6 network connection is disclosed. The computer program comprises executable instructions for: capturing outgoing IPv6 packets, the outgoing IPv6 packets having a stateless autoconfiguration IPv6 address, which is configured at least partially based on an image forming apparatus identifier; modifying the IPv6 address associated with the image forming apparatus identifier to generate a modified IPv6 address; and returning the outgoing IPv6 packet with the modified IPv6 address to a network layer of the Internet Protocol of the image forming apparatus.

The computer readable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system that facilitates enhancing security for a computer device utilizing an IPv6 network connection, comprising:
   a computer device, the computer device having a software module, which runs on an operating system of the computer device, and wherein the software module performs the following steps:
   capturing outgoing IPv6 packets before the outgoing IPv6 packets are sent over the IPv6 network connection, the outgoing IPv6 packets having a stateless autoconfiguration IPv6 address, which is configured at least partially based on a computer device identifier assigned to the computer device;
   modifying the stateless autoconfiguration IPv6 address associated with the computer device identifier to generate a modified IPv6 address, wherein the modified IPv6 address does not include the computer device identifier of the computer device; and
   returning the outgoing IPv6 packet with the modified IPv6 address to a network layer of the Internet Protocol of the computer device.

2. The system of claim 1, further comprising the step of sending the outgoing IPv6 packet with the modified IPv6 address to a client device via an IPv6 communication network.

3. The system of claim 2, wherein the software module further performs the following steps:
   capturing incoming IPv6 packets having the modified IPv6 address from the client device before the IPv6 packet is received within the network layer; and
   transforming the modified IPv6 address into the stateless autoconfiguration IPv6 address.

4. The system of claim 1, wherein the stateless autoconfiguration IPv6 address is generated pursuant to a stateless address autoconfiguration protocol.

5. The system of claim 1, wherein the IPv6 address is a globally-unique address formed from a network prefix provided to the computer device by a router, combined with the computer device identifier as generated in forming a link-local address for the computer device.

6. The system of claim 1, wherein the computer device identifier is a MAC ID (Media Access Control Identifier).

7. The system of claim 1, wherein the modified IPv6 address is generated by creating the computer device identifier for the computer device by one of the following methods: time stamp, key word, and/or random.

8. The system of claim 1, wherein the modified IPv6 address comprises:
   creating a new computer device identifier for the computer device; and generating a new modified IPv6 address after a specified period of time, an amount of traffic received and/or triggered by a security protocol.

9. The system of claim 1, wherein the network layer is under or a part of the operating system.

10. The system of claim 1, further comprising an IPv6 communication network.

11. The system of claim 1, wherein the computer device is an image forming apparatus.

12. A method for enhancing security for a computer device utilizing an IPv6 network connection, comprising:
   capturing outgoing IPv6 packets on a software module of a computer device before the outgoing IPv6 packets are sent over the IPv6 network connection, the software module running on an operating system of the computer device, and the outgoing IPv6 packets having a stateless autoconfiguration IPv6 address, which is configured at least partially based on a computer device identifier assigned to the computer device;
   modifying the stateless autoconfiguration IPv6 address associated with the computer device identifier to generate a modified IPv6 address, wherein the modified IPv6 address does not include the computer device identifier of the computer device; and
   returning the outgoing IPv6 packet with the modified IPv6 address to a network layer of the Internet Protocol of the computer device.

13. The method of claim 12, further comprising the step of sending the outgoing IPv6 packet with the modified IPv6 address to a client device via an IPv6 communication network.

14. The method of claim 13, further comprising the steps of:
   capturing incoming IPv6 packets having the modified IPv6 address from the client device before the IPv6 packet is received within the network layer; and
   transforming the modified IPv6 address into the stateless autoconfiguration IPv6 address.

15. The method of claim 12, wherein the stateless autoconfiguration IPv6 address is generated pursuant to a stateless address autoconfiguration protocol.

16. The method of claim 12, wherein the IPv6 address is a globally-unique address formed from a network prefix provided to the computer device by a router, combined with the computer device identifier as generated in forming a link-local address for the computer device.

17. The method of claim 12, wherein the modified IPv6 address comprises:
   creating a new computer device identifier for the computer device; and
   changing the new computer device identifier for the computer device after a specified amount of time, a specified amount of traffic, and/or triggered security protocol.

18. A non-transitory computer readable medium containing a computer program for enhancing security for a computer device utilizing an IPv6 network connection, wherein the computer program comprises executable instructions for:
   capturing outgoing IPv6 packets on a software module of a computer device before the outgoing IPv6 packets are sent over the IPv6 network connection, the software module running on an operating system of the computer device, and the outgoing IPv6 packets having a stateless autoconfiguration IPv6 address, which is configured at least partially based on a computer device identifier assigned to the computer device;
   modifying the stateless autoconfiguration IPv6 address associated with the computer device identifier to generate a modified IPv6 address, wherein the modified IPv6 address does not include the computer device identifier of the computer device; and
   returning the outgoing IPv6 packet with the modified IPv6 address to a network layer of the Internet Protocol of the computer device.

19. The medium of claim 18, further comprising the step of sending the outgoing IPv6 packet with the modified IPv6 address to a client device via an IPv6 communication network.

20. The medium of claim 18, further comprising the steps of:
   capturing incoming IPv6 packets having the modified IPv6 address from the client device before the IPv6 packet is received within the network layer; and
   transforming the modified IPv6 address into the stateless autoconfiguration IPv6 address.

21. The medium of claim 18, wherein the stateless autoconfiguration IPv6 address is generated pursuant to a stateless address autoconfiguration protocol, and the IPv6 address is a globally-unique address formed from a network prefix provided to the computer device by a router, combined with the computer device identifier as generated in forming a link-local address for the computer device.

22. The medium of claim 18, wherein the modified IPv6 address comprises:
   creating a new computer device identifier for the computer device; and
   changing the new computer device identifier for the computer device after a specified amount of time, a specified amount of traffic, and/or triggered security protocol.

* * * * *